(12) United States Patent
Deitmers et al.

(10) Patent No.: US 10,598,272 B2
(45) Date of Patent: Mar. 24, 2020

(54) SPUR GEAR ARRANGEMENT, GEARING SYSTEM AND WIND POWER PLANT

(71) Applicant: Siemens Aktiengesellschaft, München (DE)

(72) Inventors: Michael Deitmers, Stadtlohn (DE); Thomas Meyer, Stolberg (DE)

(73) Assignee: FLENDER GMBH, Bocholt (DE)

( * ) Notice: Subject to any disclaimer, the term of this patent is extended or adjusted under 35 U.S.C. 154(b) by 77 days.

(21) Appl. No.: 15/987,587

(22) Filed: May 23, 2018

(65) Prior Publication Data

US 2018/0340606 A1 Nov. 29, 2018

(30) Foreign Application Priority Data

May 24, 2017 (EP) .................................... 17172739

(51) Int. Cl.
*F16H 1/28* (2006.01)
*F16H 57/04* (2010.01)
*F03D 15/00* (2016.01)
*F03D 80/70* (2016.01)
*F16C 33/10* (2006.01)
*F16C 17/10* (2006.01)
(Continued)

(52) U.S. Cl.
CPC ......... *F16H 57/0479* (2013.01); *F03D 15/00* (2016.05); *F03D 80/70* (2016.05); *F16C 17/10* (2013.01); *F16C 25/02* (2013.01); *F16C 33/1055* (2013.01); *F16H 1/28* (2013.01); *F16H 57/043* (2013.01); *F16H 57/0471* (2013.01); *F05B 2260/40311* (2013.01); *F05B 2260/98* (2013.01); *F16C 2360/31* (2013.01); *F16C 2361/61* (2013.01); *F16H 2057/085* (2013.01)

(58) Field of Classification Search
CPC ...... F16H 1/28; F16H 57/0479; F16H 57/043; F16H 57/0471; F16H 2057/085; F03D 15/00; F03D 80/70; F16C 17/10; F16C 25/02; F16C 33/1055; F16C 2360/31; F16C 2361/61; F05B 2260/40311; F05B 2260/98
USPC .......................................................... 475/159
See application file for complete search history.

(56) References Cited

U.S. PATENT DOCUMENTS 8,591,371 B2   11/2013  Dinter et al.
8,657,578 B2*   2/2014  Nakashima ............. F03D 15/10
                                                              416/170 R
(Continued)

FOREIGN PATENT DOCUMENTS

DE    102011005240 A1    9/2012
DE    102015200463 A1    7/2016
(Continued)

OTHER PUBLICATIONS

Dinter et al., U.S. Pat. No. 8,591,371, Nov. 26, 2013, 2012/0108380, May 3, 2012.

*Primary Examiner* — Leslie A Nicholson, III
(74) *Attorney, Agent, or Firm* — Henry M. Feiereisen LLC

(57) ABSTRACT

A spur gear arrangement includes a spur gear, and two flange bushings configured to rotatably support the spur gear on a shaft, with each flange bushing including a flange. A lubricating film is provided between an inner side of the spur gear and each of the flange bushings. Two supporting bodies are arranged on the shaft, with the flange bushings being respectively arranged with their flange on the supporting bodies for axially bracing the spur gear.

16 Claims, 3 Drawing Sheets

(51) Int. Cl.
    *F16C 25/02*         (2006.01)
    *F16H 57/08*         (2006.01)

(56) References Cited

U.S. PATENT DOCUMENTS

| | | |
|---|---|---|
| 8,840,521 B2 * | 9/2014 | Kari ............... F16C 33/203 |
| | | 475/331 |
| 8,900,092 B2 | 12/2014 | Weist |
| 9,086,056 B2 | 7/2015 | Buch et al. |
| 9,416,867 B2 | 8/2016 | Van Den Donker et al. |
| 10,047,792 B2 * | 8/2018 | Guettler ............. F16C 17/02 |
| 10,077,832 B2 * | 9/2018 | Fugel ................. F16C 19/30 |
| 10,253,817 B2 * | 4/2019 | Plogmann ........... F16C 35/02 |
| 2006/0293142 A1 * | 12/2006 | Torres ............... F16C 19/543 |
| | | 475/331 |
| 2016/0252426 A1 | 9/2016 | Dinter et al. |

FOREIGN PATENT DOCUMENTS

| | | |
|---|---|---|
| EP | 2383480 A1 | 11/2011 |
| EP | 2679867 A1 | 1/2014 |

\* cited by examiner

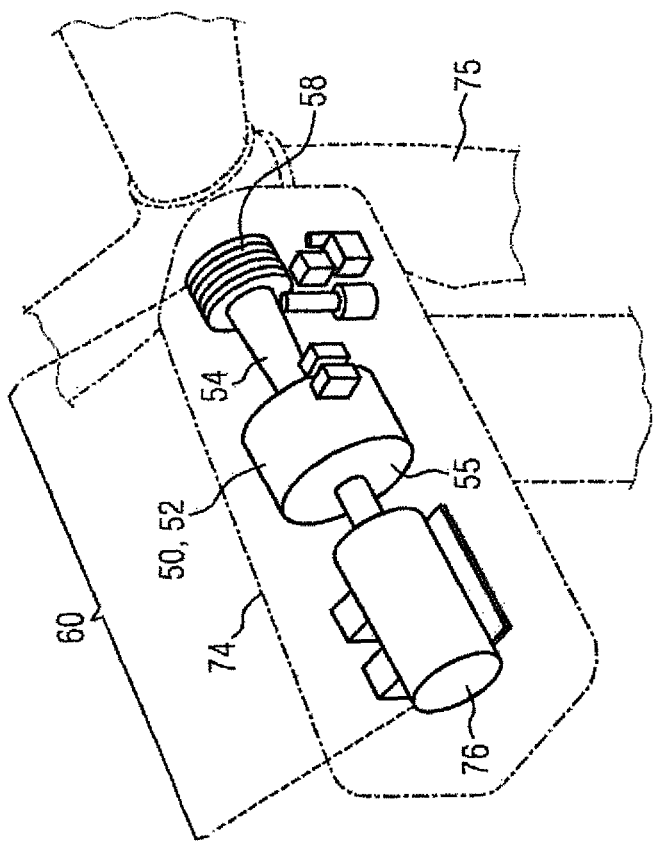
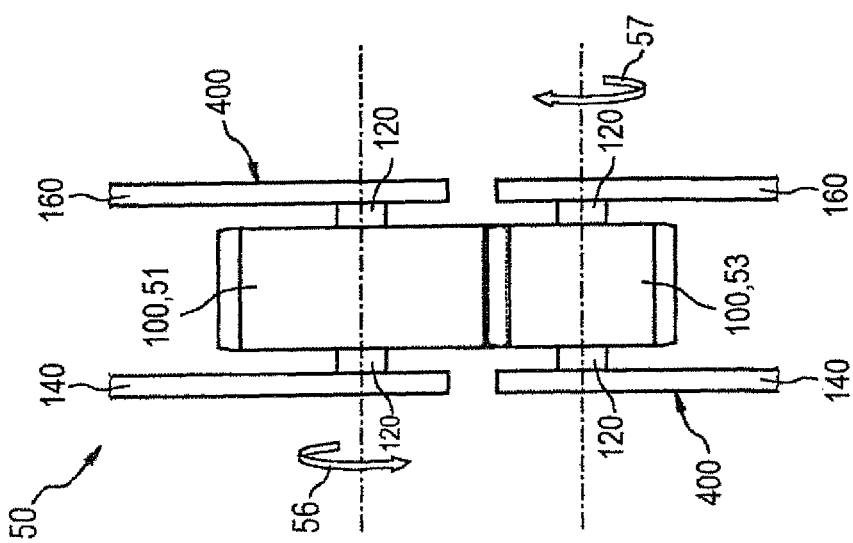

SPUR GEAR ARRANGEMENT, GEARING SYSTEM AND WIND POWER PLANT

CROSS-REFERENCES TO RELATED APPLICATIONS

This application claims the priority of European Patent Application, Serial No. 17172739.9, filed May 24, 2017, pursuant to 35 U.S.C. 119(a)-(d), the disclosure of which is incorporated herein by reference in its entirety as if fully set forth herein,

BACKGROUND OF THE INVENTION

The present invention relates to a spur gear arrangement and to a gearing system having accommodated therein a spur gear arrangement, and to a wind power plant with such a gearing system.

The following discussion of related art is provided to assist the reader in understanding the advantages of the invention, and is not to be construed as an admission that this related art is prior art to this invention.

There is an increasing need for providing bearings for spur gears that have minimal shaft diameter and high mechanical load capacity, while the bearings should still require minimal space. Furthermore, a spur gear arrangement should be easy to assemble and cost-effectively to produce. These demands are increasingly sought in the field of gearing systems, in particular planetary gears for wind power plants.

FIG. 1 shows a longitudinal section of a conventional spur gear arrangement, generally designated by reference numeral 40. The spur gear arrangement 40 has a spur gear 10 with a toothing 11 and is mounted to a shaft 12 for rotation about an axis of rotation 15. The shaft 12 has recesses 20 for supply and discharge of lubricant 25. A central one of the recesses 20 in the shaft 12 has hereby a return port 27. The shaft 12 is fastened between side panels 14, 16 of a planetary carrier (not shown in more detail), which side panels 14, 16 have a supporting wall thickness 17 in the region of the ends of the shaft 12. A lubricant supply 22 in the shaft 12 is supplied with lubricant via the side panel 16, with lubricant 25 being routed via bores 31 to lubrication pockets 28. The lubrication pockets 28 are provided on a surface of the shaft 12 and during operation form a lubricating film 29, on which two plain bearing bushings 18 are rotatably supported. The spur gear 10 is, in turn, received on the plain bearing bushings 18 and rotatable about the axis of rotation 15 by means of the lubricating film 29 between the shaft 12 and the plain bearing bushings 18. The plain bearing bushings 18 are arranged at a distance from one another, with an intermediate space 36 being defined between the plain bearing bushings 18. The intermediate space 36 is delimited in an axially outer direction, indicated by arrows 33, by front faces 45 of the plain bearing bushings 18. Furthermore, the intermediate space 36 is delimited by a circumferential projection 19 of the spur gear 10. The terms "axially outer" and "axially inner" relate hereby to the intermediate space 36. Arrows 33 indicate in FIG. 1 the axially outer direction, and arrows 37 indicate in FIG. 1 an axially inner direction. The terms "radially outer" and "radially inner" relate to the axis of rotation 15. The radially outer direction is indicated in FIG. 1 by arrow 21, and the radially inner direction is indicated by arrow 23. On account of the axial lengths 38 of the plain bearing bushings 18, their axially inner front faces 45 rest on the projection 19 of the spur gear 10. The axially outer ends of the plain bearing bushings 18 extend essentially flush with the spur gear 10. The axial length 38 of the plain bearing bushings 18 corresponds in each case to less than half of the spur gear thickness 13. Thrust washers 30 are arranged in the region of the respective axially outer end of the plain bearing bushings 18 to assist a normal operation of the spur gear 10. A bearing diameter 35, which corresponds essentially to the diameter of the shaft 12, is defined by the lubricating film 29.

It would be desirable and advantageous to provide an improved spur gear arrangement to obviate prior art shortcomings.

SUMMARY OF THE INVENTION

According to one aspect of the present invention, a spur gear arrangement includes a spur gear, two flange bushings configured to rotatably support the spur gear on a shaft, each flange bushing including a flange, a lubricating film provided between an inner side of the spur gear and each of the flange bushings, and two supporting bodies arranged on the shaft, wherein the flange bushings are respectively arranged with their flange on the supporting bodies for axially bracing the spur gear.

In accordance with the present invention, the spur gear of the spur gear arrangement is received rotatably on a shaft, which is in turn supported on two side panels. The spur gear rests with a radial inner surface to the radial outer surfaces of two flange bushings, where a lubricating film and thus a plain bearing can be formed, respectively. The flange bushings each have a flange and rest on supporting bodies respectively, which are attached to the lateral area of the shaft. The presence of the supporting bodies increases the diameter of the ring surface, on which a radial inner side of the spur gear runs on the flange bushings. The flange bushings are arranged on the supporting bodies such that the flange bushings brace the spur gear in an axial direction in interaction with the supporting bodies. For this purpose, the flange bushings are arranged such that an axial force on the spur gear is received by the flange of at least one flange bushing, which in turn braces against a supporting body.

In accordance with the present invention, a spur gear arrangement can be realized in which a greater diameter of the plain bearing for the spur gear is achieved while a shaft has a constant diameter. As a result of the enlarged diameter of the plain bearing, a load carrying capacity is increased. The increase in the load carrying capacity can hereby be achieved without modifying the configuration of the side panels. On account of the axial bracing of the spur gear by means of the flange bushings, the need for provision of thrust washers is eliminated. The absence of such thrust washers saves installation space in the axial direction. Furthermore, by increasing the diameter of the plain bearing, material can be saved on the spur gear. Spur gears are oftentimes manufactured from highly stressable materials, which are difficult to process. Still, with the present invention, manufacture becomes more rapid and more cost-efficient. The increased compactness and efficiency of a spur gear arrangement according to the present invention enables construction of, for example, smaller gearing systems, in particular planetary gear mechanisms, without restricting mechanical performance and stress resistance while simultaneously increasing cost efficiency.

According to another advantageous feature of the present invention, the flange of each of the flange bushings can brace against an axially inner front face of the associated one of the supporting bodies. The axial inner front face is to be understood here as the front face of the supporting body, which faces an intermediate space between the supporting bodies. The flange bushings can each have a flange directed radially inward, which, in the assembled state, braces against the axial inner front face of the associated supporting body. Furthermore, the spur gear can have a projection on a radial inner side to support the spur gear in the axial direction against at least the flange of a flange bushing. Thus, the spur gear is braced in the axial direction in the region of the axially internally lying section of the shaft. The spur gear arrangement can be assembled easily and rapidly and is, as a result, cost-efficient and simple to repair. Furthermore, a spur gear arrangement according to the present invention, allows the use of flange bushings of reduced axial length, when compared with prior art approaches. In effect, a cost-intensive long bushing is being replaced by two shorter, more cost-efficient flange bushings. This further enhances efficiency of a spur gear arrangement according to the present invention.

According to another advantageous feature of the present invention, the shaft, at least one of the supporting bodies and one of the flange bushings associated to the one of the supporting bodies can each have a bore and can be arranged relative to one another such as to enable passage of a lubricant. For example, lubricant enters the supporting body from the shaft, flows through the flange bushing and then reaches the ring surface, upon which the spur gear runs on the flange bushing. A lubricating film is formed there by the lubricant, and a plain bearing is thus realized. A spur gear arrangement according to the present invention thus offers adequate degree of stability, and allows for bores and therefore local material weakenings, in order to enable a flow of lubricant. The spur gear arrangement is thus also suited to use in highly stressed spur gears, for example in gearing systems, in particular planetary gear mechanisms.

According to another advantageous feature of the present invention, at least one of the flange bushings can be provided on a lateral area with a lubrication pocket. Lubricant supplied via bores is distributed in the lubrication pocket over an entire surface of the radially inner surface of the spur gear and thus ensures a constant and effective lubricating film.

According to another advantageous feature of the present invention, the supporting bodies can be attached to the shaft in fixed rotative engagement and extend all-round. As an alternative or in addition, at least one of the supporting bodies can have a star shape, which supports the associated flange bushing radially from the inside. At least one of the supporting bodies can also include a radially outer ring, which is supported by a radially inner support structure, which braces against the shaft.

According to another advantageous feature of the present invention, the supporting bodies can be arranged such as to define an intermediate space there between in the region of the shaft for passage of a lubricant. The passage in the intermediate space can serve as drainage for lubricant. This achieves a more compact functional integration and therefore further saves installation space.

According to another advantageous feature of the present invention, a spacer sleeve can be attached in the intermediate space between the supporting bodies. The spacer sleeve can have an opening in the radial direction to allow passage of lubricant. The spacer sleeve is provided to withstand a pressure load acting on the supporting body in the axial direction on account of a mounting force. An appropriate axial length of the spacer sleeve enables adjustments between the projection of the spur gear, the bushings of the flange bushings and the supporting bodies.

According to another advantageous feature of the present invention, one of the supporting bodies can have an axial length which is 20% to 80% of a thickness of the spur gear. The other one of the supporting bodies has corresponding length, as a function thereof and possibly as a function of an axial length of the spacer sleeve. The supporting bodies are configured to end substantially axially flush with the spur gear. The position of the intermediate space and the axial length of the flange bushings can thus be adjusted to structural requirements. For instance, an adjustment to the position of a lubricant supply is possible. A spur gear arrangement according to the present invention can therefore be appropriately modified and used for retrofitting an existing spur gear arrangement, for instance in a gearing system or planetary gear mechanism. A spur gear arrangement according to the present invention can thus be used for a broad range of applications.

According to another advantageous feature of the present invention, the spur gear can be embodied as a planetary wheel of a planetary gear mechanism. The side panels, in which the shaft is received, are hereby parts of a planetary carrier, which is configured to rotate about a sun shaft in a hollow wheel. The advantages achieved with a spur gear arrangement according to the present invention become particularly apparent when a planetary wheel is involved. In particular, a more compact planetary carrier is possible as a result and can be produced in a more economical and rapid manner.

According to another advantageous feature of the present invention, the supporting bodies can have a same external diameter. Consequently, flange bushings with same dimensions, in particular internal diameter, wall thickness and external diameter, can also be used. The supporting bodies and flange bushings become thus exchangeable to ensure simplified assembly. Furthermore, uniform mechanical stress and wear on these components can be achieved by dimensioning the supporting bodies and/or the flange bushings identically. As a result, the performance of the materials employed is utilized effectively and an increased service life of the components employed is achieved.

According to another aspect of the present invention, a gearing system includes a drive spur gear, an output spur gear in mesh with the drive spur gear, and a spur gear arrangement including a spur gear, two flange bushings configured to rotatably support the spur gear on a shaft, each flange bushing including a flange, a lubricating film provided between an inner side of the spur gear and each of the flange bushings, and two supporting bodies arranged on the shaft, wherein the flange bushings are respectively arranged with their flange on the supporting bodies for axially bracing the spur gear, wherein the drive spur gear and/or the output spur gear represents the spur gear of the spur gear arrangement.

Thus, the drive spur gear may be any spur gear in the gearing system, from which torque is transmitted onto an adjacent spur gear, i.e. the output spur gear. In accordance with the invention, the drive spur gear and/or the output spur gear are supported rotatably in a spur gear arrangement, which is embodied in accordance with one of the aforedescribed embodiments. The gearing system can be embodied as a spur gear mechanism, for instance as an industrial gear mechanism. As an alternative, the gearing system can also be constructed as a planetary gear mechanism, in which the spur gear is embodied as a planetary wheel. A spur gear arrangement according to the present invention provides for a more compact planetary carrier, which, despite its reduced dimensions, is equally stress resistant and just as powerful as comparably large planetary carriers. The gearing system is overall more cost-efficient and simple in terms of assembly and repair.

According to yet another aspect of the present invention, a wind power plant includes a gearing system which includes a spur gear arrangement, the spur gear arrangement including a spur gear, two flange bushings configured to rotatably support the spur gear on a shaft, each flange bushing including a flange, a lubricating film provided between an inner side of the spur gear and each of the flange bushings, and two supporting bodies arranged on the shaft, wherein the flange bushings are respectively arranged with their flange on the supporting bodies for axially bracing the spur gear, a generator operably connected to the gearing system, and a rotor including a rotor shaft coupling the rotor in a torque-transmitting manner to the gearing system.

The gearing system can be received in a nacelle together with the generator. The rotor shaft transmits into the gearing system rotational power, which is converted by the gearing system as regards torque and rotational speed. Electricity is generated by the generator. The gearing system can be configured in accordance with one of the afore-described embodiments. The gearing system is of reduced axial length and thus can be installed in the nacelle in space-saving manner.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 3 is a longitudinal section of a gearing system of the spur gear arrangement according to the present invention; and FIG. 4 a cut oblique view of a detail of a wind power plant in accordance with the present invention.

DETAILED DESCRIPTION OF PREFERRED EMBODIMENTS

Figure 1:
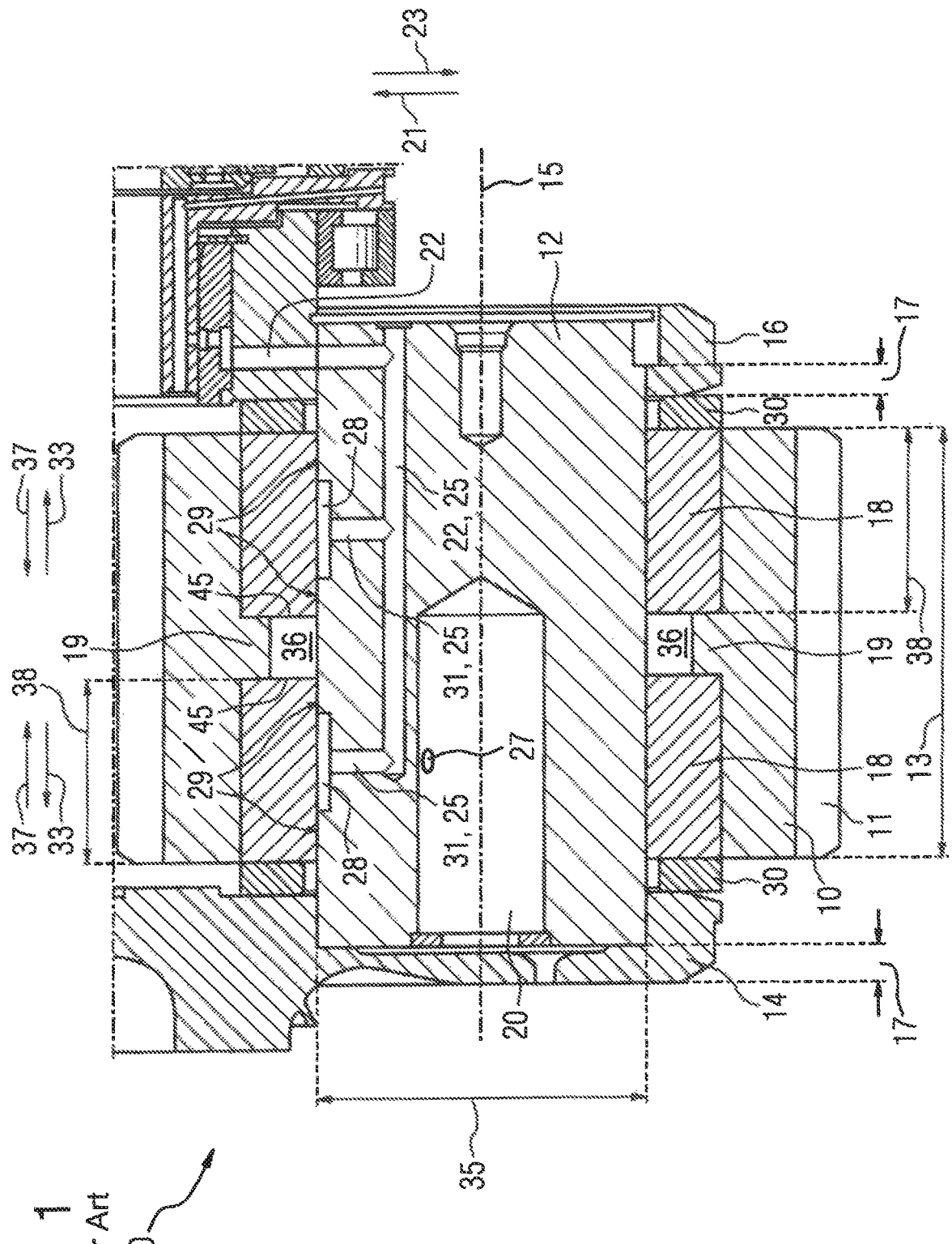
FIG. 1 is a longitudinal section of a conventional spur gear arrangement.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Figure 2:
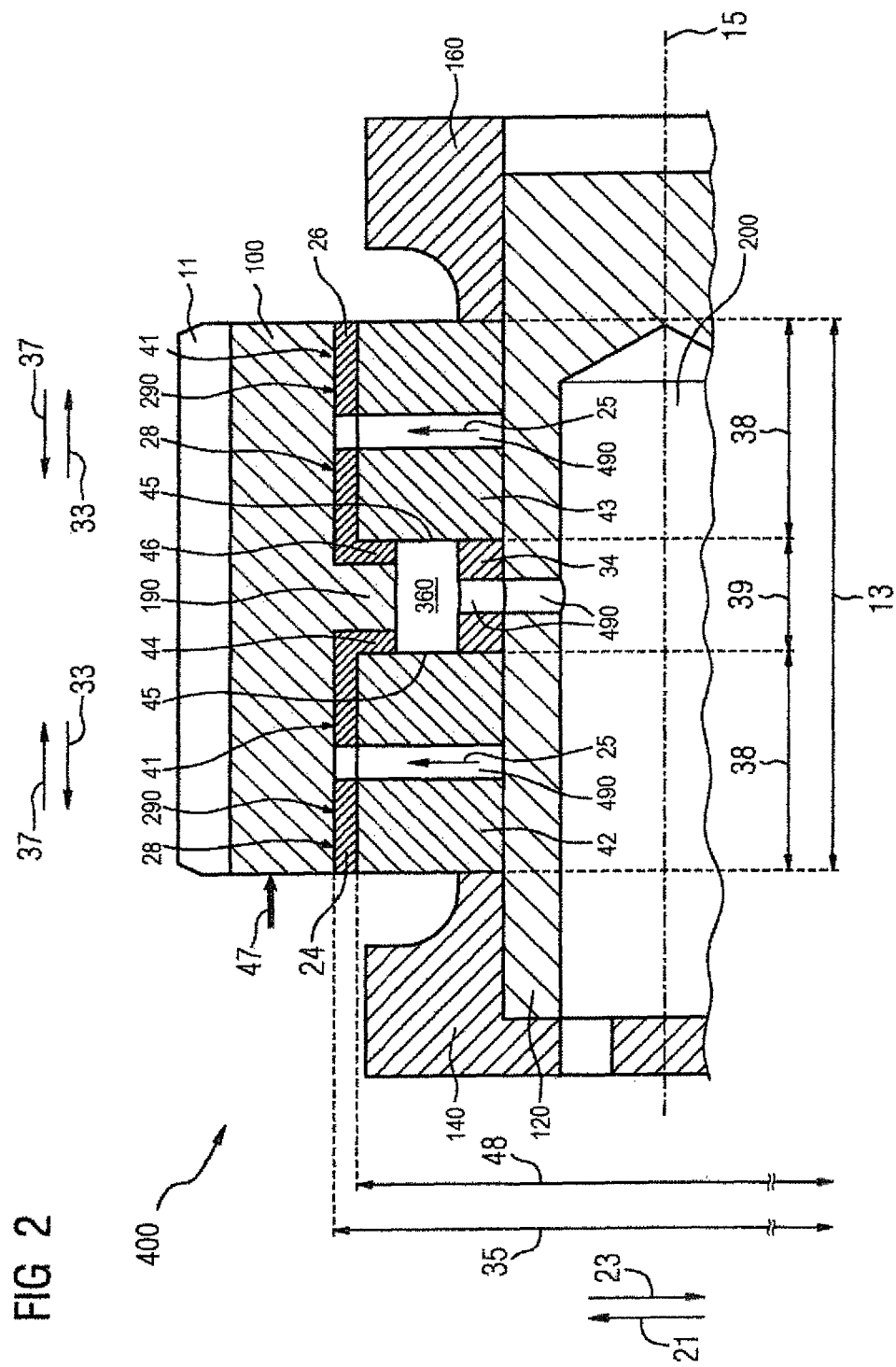
FIG. 2 is a longitudinal section of a spur gear arrangement according to the present invention.

Turning now to the drawing, and in particular to FIG. 2, there is shown a longitudinal section of a spur gear arrangement according to the present invention, generally designated by reference numeral 400. In the following description, parts corresponding with those in FIG. 1 will be identified, where appropriate for the understanding of the invention, by corresponding reference numerals each multiplied by "10". The spur gear arrangement 400 includes a spur gear 100 having a toothing 11 and arranged on a shaft 120 for rotation about an axis of rotation 15. The shaft 120 extends between two side panels 140, 160, in which the shaft 120 is received. The shaft 120 has a recess 200 for discharge of lubricant 25. Supporting bodies 42, 43 are connected to the shaft 120 in fixed rotative engagement. The supporting bodies 42, 43 have bores 490 to convey lubricant 25 to a plain bearing. Flange bushings 24, 26 are disposed between the spur gear 100 and the supporting bodies 42, 43 on the radially outer surfaces of the supporting bodies 42, 43, respectively, and have each a flange 44, 46. The flange bushings 24, 26 are arranged such that their flanges 44, 46 are disposed in the region of an axially inner front face 45 of the associated supporting bodies 42, 43. Furthermore, the spur gear 100 has an inner side 41 formed with a projection 190, which projects radially into an intermediate space 360 between the supporting bodies 42, 43. The projection 190 is also disposed between the flanges 44, 46 of the flange bushings 24, 26. As a result, a form-fit is achieved against an axial force 47 acting on the spur gear 100. The spur gear 100 is therefore braced against axial displacement.

Bores 490 are also provided in the flange bushings 24, 26 in alignment with the bores 490 in the supporting bodies 42, 43 to allow passage of lubricant 25. As a result, the lubricant 25 forms a lubricating film 290, on which the spur gear 100 runs during normal operation. For this purpose, the flange bushings 24, 26 are provided with lubrication pockets 28 (not shown in greater detail). The intermediate space 360 between the supporting bodies 42, 43 is delimited radially outward by the flanges 44, 46 of the flange bushings 24, 26 and by the projection 190 of the spur gear 100. A spacer sleeve 34 which has an axial length 39 is arranged on the shaft 120. An axial length 39 of the spacer sleeve 39 and the axial lengths 38 of the supporting bodies 42, 43 correspond overall essentially to the thickness 13 of the spur gear 100. A clearance between the projection 190 and the flange bushings 24, 26 can be adjusted by correspondingly dimensioning the spacer sleeve 34, the projection 190 and the flanges 44, 46 of the flange bushings 24, 26. The clearance may hereby be realized as a clearance fit or transition fit.

Bores 490 are also provided in the spacer sleeve 34 and the shaft 120 to allow passage of lubricant 25 in the region of the flange bushings 24, 26. Used lubricant 25 is discharged through the bores 490 in the spacer sleeve 34 and the shaft 120. The supporting bodies 42, 43 each have a diameter 48 sized such that the position of the lubricating film 29 is shifted radially outward when compared with the conventional spur gear arrangement 40 of FIG. 1. As a result of the material thickness of the flange bushings 24, 26, a bearing diameter 35 is established which is significantly greater. The term "bearing diameter" relates hereby to a radial position of the lubricating film 290, on which the spur gear 100 runs during normal operation. Overall, the load carrying capacity of the spur gear arrangement 400 is increased and any need for thrust washers, as shown in FIG. 1, is eliminated. The increased bearing diameter 35 allows the use of less material for production of the spur gear 100 while the diameter can still remain the same. The need to use cost-intensive heavy-duty material is thus reduced. The absence of thrust washers also enables a design of the spur gear arrangement 400 which saves space in the axial direction.

In the context of FIG. 2, an axially inner direction is understood to relate to a direction which is aligned substantially parallel to the axis of rotation 15 toward the intermediate space 36. The axially inner direction is indicated by arrows 37. Accordingly, the axially outer direction, which is indicated by arrows 33, extends in opposition to the axially inner direction. The radially inner direction is aligned essentially vertically toward the axis of rotation 15 in FIG. 2 and is indicated by arrow 23. Accordingly, the radially outer direction indicated by arrow 21 extends in opposition to the radially inner direction.

Referring now to FIG. 3, there is shown a longitudinal section of a gearing system 50 of the spur gear arrangement 400. The gearing system 50 includes a drive spur gear 51 and an output spur gear 53, which mesh with one another. The drive spur gear 51 rotates in a first rotational direction 56, which is directed in opposition to a second rotational direction 57 about which the output spur gear 53 rotates. The drive spur gear 51 and the output spur gear 53 are configured as spur gears 100 and mounted on shafts 120, respectively. The shafts 120 are supported on two side panels 140, 160. The drive spur gear 51 is embodied as a spur gear 100 in one embodiment of the spur gear arrangement 400. The output spur gear 53 is likewise embodied as a spur gear 100 in a spur gear arrangement 400. The side panels 140, 160 and the shafts 120 received therein are also components of the spur gear arrangements 400. Overall, the spur gear arrangements 400 have a compact configuration.

FIG. 4 shows a cut oblique view of a detail of a wind power plant in accordance with the present invention, generally designated by reference numeral 70. The wind power plant 70 includes a rotor 75, which is connected via a rotor shaft 54 in a torque-transmitting manner with a planetary gear mechanism 50. The rotor shaft 54 is received in a rotor bearing 58. The planetary gear mechanism 50, in turn, is coupled to a generator 76 for generating electricity. The rotor bearing 58, the rotor shaft 54, the planetary gear mechanism 50, and the generator 76 form part of a drive train 60 of the wind power plant 70. The planetary gear mechanism 50 includes at least one planetary carrier 52 (not shown in more detail) which includes an embodiment of a spur gear arrangement 400 according to the present invention. The planetary carrier 52 includes at least one planetary wheel 55 of the planetary gear mechanism 50 and is configured as spur gear 100. As a result, the planetary gear mechanism 50 is of compact configuration in an axial direction.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A spur gear arrangement, comprising:
   a spur gear;
   two flange bushings configured to rotatably support the spur gear on a shaft, each said flange bushing including a flange;
   a lubricating film provided between an inner side of the spur gear and each of the flange bushings; and
   two supporting bodies arranged on the shaft,
   wherein the flange bushings are respectively arranged with their flange on the supporting bodies for axially bracing the spur gear.

2. The spur gear arrangement of claim 1, wherein the flange of each of the flange bushings braces against an axially inner front face of the associated one of the supporting bodies.

3. The spur gear arrangement of claim 1, wherein the shaft, at least one of the supporting bodies and one of the flange bushings associated to the one of the supporting bodies have each a bore for passage of a lubricant.

4. The spur gear arrangement of claim 1, wherein at least one of the flange bushings is provided with a lubrication pocket.

5. The spur gear arrangement of claim 1, wherein the supporting bodies are attached to the shaft in fixed rotative engagement.

6. The spur gear arrangement of claim 1, wherein the supporting bodies are arranged such as to define an intermediate space there between for passage of a lubricant.

7. The spur gear arrangement of claim 6, further comprising a spacer sleeve arranged in the intermediate space between the supporting bodies.

8. The spur gear arrangement of claim 1, wherein one of the supporting bodies has an axial length which is 20% to 80% of a thickness of the spur gear.

9. The spur gear arrangement of claim 1, wherein the spur gear is embodied as a planetary wheel of a planetary gear mechanism.

10. The spur gear arrangement of claim 1, wherein the supporting bodies have a same external diameter.

11. A gearing system, comprising a spur gear arrangement, said spur gear arrangement comprising a spur gear, two flange bushings configured to rotatably support the spur gear on a shaft, each said flange bushing including a flange, a lubricating film provided between an inner side of the spur gear and each of the flange bushings, and two supporting bodies arranged on the shaft, wherein the flange bushings are respectively arranged with their flange on the supporting bodies for axially bracing the spur gear.

12. The gearing system of claim 11, further comprising a drive spur gear, and an output spur gear in mesh with the drive spur gear, wherein the drive spur gear or the output spur gear represents the spur gear of the spur gear arrangement.

13. The gearing system of claim 11, constructed in the form of a planetary gear mechanism including a planetary wheel, said spur gear being embodied as the planetary wheel.

14. A wind power plant, comprising:
   a gearing system which includes a spur gear arrangement, said spur gear arrangement comprising a spur gear, two flange bushings configured to rotatably support the spur gear on a shaft, each said flange bushing including a flange, a lubricating film provided between an inner side of the spur gear and each of the flange bushings, and two supporting bodies arranged on the shaft, wherein the flange bushings are respectively arranged with their flange on the supporting bodies for axially bracing the spur gear;
   a generator operably connected to the gearing system; and
   a rotor including a rotor shaft coupling the rotor in a torque-transmitting manner to the gearing system.

15. The wind power plant of claim 14, further comprising a drive spur gear, and an output spur gear in mesh with the drive spur gear, wherein the drive spur gear or the output spur gear represents the spur gear of the spur gear arrangement.

16. The wind power plant of claim 14, wherein the gearing system is constructed in the form of a planetary gear mechanism including a planetary wheel, said spur gear being embodied as the planetary wheel.

* * * * *